(12) United States Patent
Cristofaro

(10) Patent No.: US 11,352,756 B2
(45) Date of Patent: Jun. 7, 2022

(54) PLOW BLADE TRAFFIC LIGHTING SYSTEM

(71) Applicant: David Cristofaro, Pittsford, NY (US)

(72) Inventor: David Cristofaro, Pittsford, NY (US)

( * ) Notice: Subject to any disclaimer, the term of this patent is extended or adjusted under 35 U.S.C. 154(b) by 46 days.

(21) Appl. No.: 17/092,457

(22) Filed: Nov. 9, 2020

(65) Prior Publication Data

US 2021/0285172 A1    Sep. 16, 2021

Related U.S. Application Data

(60) Provisional application No. 62/988,971, filed on Mar. 13, 2020.

(51) Int. Cl.
*E01H 5/06* (2006.01)
*B60Q 1/50* (2006.01)

(52) U.S. Cl.
CPC ............... *E01H 5/066* (2013.01); *B60Q 1/50* (2013.01); *E01H 5/061* (2013.01)

(58) Field of Classification Search
CPC ........ B60Q 1/2661; B60Q 1/32; B60Q 1/484; B60Q 1/50; E01H 5/061; E01H 5/066
See application file for complete search history.

(56) References Cited

U.S. PATENT DOCUMENTS

| | | | |
|---|---|---|---|
| 9,617,699 B2* | 4/2017 | Westman | B60Q 1/32 |
| 9,902,312 B1* | 2/2018 | Buechs | E01H 5/061 |
| 2007/0177269 A1* | 8/2007 | DePaoli | E01H 5/066 |
| | | | 359/533 |

* cited by examiner

*Primary Examiner* — Omeed Alizada
(74) *Attorney, Agent, or Firm* — Louis S. Horvath

(57) ABSTRACT

A plow blade has a moldboard shaped with a concave front contact surface that faces a forward direction and has a convex rear frame surface that faces an opposite rearward direction, wherein the rear frame surface has a supporting frame with one or more supporting frame members that extend in the rearward direction. A first indicating lamp is coupled to the plow blade and is energizable to emit light of a first color in the rearward direction, wherein the energized first indicating lamp is concealed from visibility from the forward direction. A second indicating lamp is coupled to the plow blade, energizable to emit light of a second color, and visible from the forward direction.

16 Claims, 14 Drawing Sheets

PLOW BLADE TRAFFIC LIGHTING SYSTEM

CROSS REFERENCE TO RELATED APPLICATIONS

This application claims the benefit of U.S. Provisional Application Ser. 62/988,971, entitled "PLOW BLADE TRAFFIC LIGHTING SYSTEM", in the name of David Cristofaro, filed Mar. 13, 2020 and incorporated herein in its entirety.

FIELD OF THE INVENTION

The disclosure relates generally to lighting accessories for traffic vehicles and more particularly relates to apparatus and methods for indicating the location and extent of protruding surfaces and features for plow, earth-moving, and similar equipment that extends from a vehicle and is used to move snow, earth, or sediment.

BACKGROUND

Snow plowing vehicles can have one or more snow plow blades that extend outward from the vehicle, supported by various types of frame structures. Plow blades typically mount to the front or forward portions of the vehicle, but can alternately extend behind, or to one or both sides of, the vehicle to which they are coupled. Generally extending outward from the front, plow blades may alternately or additionally extend outward from the sides of the truck or other vehicle, often extended beyond the width of the truck body, or extending beyond the center-to-center widthwise spacing (track) of the tires on the truck.

It is well recognized that having one or more projecting snow plow blades presents a potential traffic safety hazard. A number of accidents each year, resulting in high cost and injury, result from driver inability to clearly perceive the full extent of the plow blade or blades that extend beyond the width of the truck body. The visibility problem is further compounded with blade manipulation, such as when the driver varies the angle of the blades relative to the vehicle. Particularly in the harsh weather conditions under which plows operate, a combination of factors can make it difficult for edges and angular orientation of plow blades to be accurately identified by other drivers.

Difficulties related to plow blade visibility apply for smaller commercial plows, such as those used by contractors who clear driveways for their customers. For large plows used on major roadways, problems of plow visibility are even more pronounced. Municipal and state plows, for example, often extend beyond 10 ft in width. With standard road lane widths at or near 10 ft. on average, this means that snow plows can easily extend over one full lane. In most cases, municipal and state snow plows are designed to clear one full lane in a single pass, along with clearing a shoulder of the road and possibly clearing a portion of one additional lane. Plows sized to handle this task can extend significantly beyond the width defined between headlights on the plow truck, making the edges of the extended blades difficult or impossible for other drivers to see. Because large municipal and state plows must work along the roadway under adverse conditions for traction and visibility, difficulties in judging plow extension and distances are a significant problem. Driver and pedestrian safety can be jeopardized, and serious accidents and injuries too often occur.

Attempts to address the problem for making the plow extension, edges, and other features more readily visible under nighttime or storm conditions have thus far proved disappointing. Visibility of reflective devices, relying on external light sources, is easily obscured by dirt, snow, and ice. Lighting mounted on plow "whiskers" or clamped to exposed surfaces of the plow may only give an approximation of actual plow position and can be easily knocked out of position or dislodged altogether under the harsh conditions of snow removal.

Solutions for simply affixing a light onto the plow, even if successful, still fail to remedy another safety problem. Conventional approaches provide no indication of plow direction or front/rear orientation. A nearby driver moving in either direction, or a person standing nearby, would benefit by readily recognizing whether the front or rear of the plow moldboard is the side in view. In the absence of directional indication, the driver in an approaching or backing vehicle, for example, can easily become confused and misinterpret plow orientation and direction.

Solutions presented herein for snow plow blades can also apply to other equipment attached to a truck or other vehicle, including but not limited to cases wherein equipment extends beyond the width of the body of the truck or other vehicle, or extends beyond the center-to-center widthwise spacing (track) of tires on the truck. Examples of such equipment often attached to a truck include front-loaders, and various agricultural equipment that may be fastened against the truck body. For example, when front-loaders and agricultural equipment are mounted onto a truck, their overall width and placement on the truck may be very difficult for other drivers to ascertain. This can be especially true during times of limited visibility such as during dusk, at night, when fog is present, and during rain and snow storms, for example.

SUMMARY

The Applicant addresses the problem of visibility for snow plows and other vehicular attachments. Embodiments of the present disclosure provide an arrangement of indicating lamps with high-luminosity light emitters located at particular positions along the plow or other vehicular attachment.

The Applicant addresses more generally the problem of visibility of snow plow blades and other attachments and equipment attached to the front, rear, and/or sides of a motor vehicle, using an arrangement of indicating lamps at particular positions along the mounted plow blade or other attached equipment so that the lighting meets a number of safety-related goals, including:

(i) high visibility to others driving behind or walking near a vehicle with attached plow blade or other equipment, as well as passing the vehicle, whether traveling in the same direction or from an oncoming direction;
 (ii) clear and unambiguous indication, according to indicator lamp color, as to which surface of the plow blade or other attached equipment, front or rear, is in view, thus orienting the viewer to the potential travel path of the plow and identifying its approximate edges;
 (iii) robustness, with indicator apparatus positioned so that indicating lights can withstand the rigors of the plowing or other heavy equipment environment, with reduced likelihood of damage or inadvertent dislodgement;
 (iv) clear definition of portions of the snow plow blade or other attached equipment that are likely to obstruct or conflict with viewer movement, taking measures to indicate plow extent along and near plow edges, thus helping to prevent a driver from executing premature lane changes, such as cutting in too closely front of the vehicle having attached equipment or passing too close to the vehicle, whether the plow is secured along the vehicle body or extended outward from the vehicle body;

(v) operable during use of the plow blade or other equipment, during plow blade transport, or when the vehicle is parked or temporarily stopped.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to an embodiment of the present disclosure, there is provided a plow blade comprising:

a moldboard shaped with a concave front contact surface that faces a forward direction and having a convex rear frame surface that faces an opposite rearward direction, wherein the rear frame surface has a supporting frame with one or more supporting frame members that extend in the rearward direction, a first indicating lamp that is coupled to the plow blade and is energizable to emit light of a first color in the rearward direction, wherein the energized first indicating lamp is concealed from visibility from the forward direction;

a second indicating lamp that is coupled to the plow blade, energizable to emit light of a second color, and visible from the forward direction.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

DETAILED DESCRIPTION

Figure 1A:
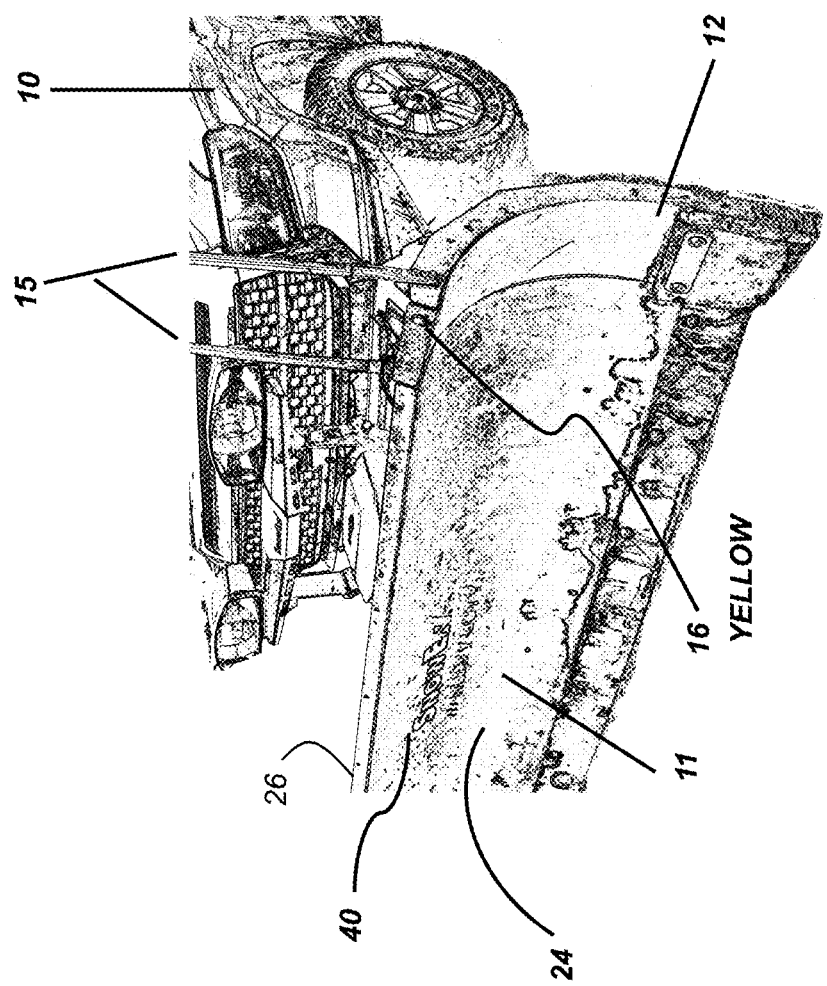
FIG. 1A shows a front perspective view of a corner of a snow plow blade having an indicating lamp mounted in a forward-facing position according to an embodiment of the present disclosure.

The following is a detailed description of the preferred embodiments of the invention, reference being made to the drawings in which the same reference numerals identify the same elements of structure in each of the several figures.

In the context of the present disclosure, the term "snow plow" or "snow plow blade" or, more generally, "plow" indicates the attachment to a vehicle that equips the vehicle for moving snow, earth, or sediment and includes the plow blade, frame, and attachment structure that are mounted as an accessory to a vehicle, rather than indicating the combination of the plow blades with the vehicle to which the plow blade or blades are attached.

In the context of the present disclosure, the term "moldboard" is considered to be equivalent to the plate structure that forms the blade of the plow assembly. The moldboard is the metal blade or plate, generally curved, that has a concave "contact surface" for pushing snow, earth, sediment, or other heavy material along while the plow blade is being pushed by a vehicle in a forward direction; the opposite convex "frame surface" of the moldboard has an attached supporting frame that typically consists of one or more frame support members that the vehicle applies force against to cause plow movement, such as struts, ribs, and braces.

For the purposes of the present disclosure, viewing the plow blade 11 from the forward direction can be interpreted as viewing the plow blade 11 facing from a position that shows at least portions of the front, concave contact surface of the plow blade, but without visibility of the opposite rear frame surface. Viewing the plow blade 11 from the rear direction can be interpreted as facing the blade from a position that allows visibility only to rear, frame surface portions of the plow blade and not to portions of the front contact surface.

The "outside edge" of the plow blade is the bordering edge or surface of the blade between the contact surface and frame surface. The plow frame further has connecting members, extending from the frame surface, that mount the plow assembly to a truck, bulldozer, or other vehicle for moving the snow or other heavy material.

The snow plow blade is an accessory item that can be attached to the front, rear, and sides of a truck or other vehicle. There are a number of configurations for snow plows of various types, with different blade arrangements, curvatures, mounting features, and support systems. Embodiments of the present disclosure can be adapted for use with snow plows of different types and sizes, for improving visibility of the snow plow blade from positions at the front, rear, or side of the vehicle. Embodiments of the present disclosure can also be adapted for use with other mountable plows that employ a plow blade having a curved contact surface and an opposite frame surface, as well as for various types of attached equipment including front loaders, and agricultural equipment attached to a truck. This can include equipment that extends beyond the width of the vehicle, or extends beyond the center-to-center widthwise spacing (track) of the tires on the vehicle to which the equipment is attached.

Figure 1B:
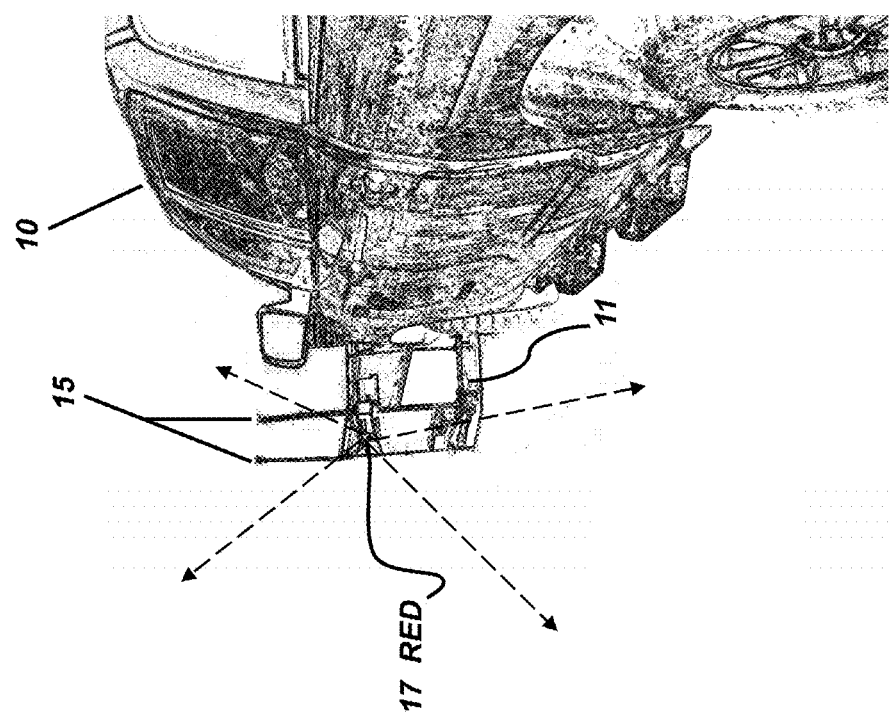
FIG. 1B shows a rear perspective view of a corner of a snow plow blade having an indicating lamp mounted in a rearward-facing position according to an embodiment of the present disclosure.

A snow plow blade 11, shown in FIGS. 1A and 1B, is lowered for contact and in position to travel against the surface to be plowed. Plow blade 11 supports a moldboard 40 with a front contact surface, commonly shaped as a plate that is generally curved (concave to the snow being plowed) and relatively smooth, and pushed against the snow to move the snow along during plow operation, urging the snow forward and typically to the side of a vehicle 10 as it moves forward along the surface of the road, driveway, or other thoroughfare. The blade 11 has a rear frame surface, visible in part in FIG. 1B, used for bracing and mounting moldboard 40 and typically featured with supporting ribs and other frame elements.

The Applicant's solution for increased plow safety uses indicating lights or lamps intended not only to indicate boundaries and edges of the snow plow blade structure, but also to more definitively indicate blade front/rear orientation to drivers and pedestrians nearby.

An indicating lamp, as the term is used herein, comprises one or more light emitters, packaged in one or more housings, with its associated electronic connectors. Light emitters can comprise elements such as LEDs (light-emitting diodes), lasers, incandescent bulbs, halogen elements, electroluminescent devices, and other light emitters known in the art. Light emitters are preferably Department of Transportation (DOT)-compliant and relatively very bright and highly directional, sending the bulk of emitted light illumination in the direction towards which they are pointed. The indicating lamps are mounted at positions on the plow blade structure itself, and within the outline of the plow blade, as viewed facing front or rear of the plow blade, rather than extending past edges of the blade. For ruggedness and durability, indicating lamps are preferably not mounted on the whiskers 15 or on other appendages extending from the plow blade.

The indicating lamps are arranged for quick recognition by the viewer, typically a driver or pedestrian who is near plow blade 11. The indicating lamps are distinguishable from each other according to the colors of emitted light. For reference herein, indicating lamps that incorporate yellow light emitters, for example, can be alternately termed yellow indicating lamps. Indicating lamps that incorporate red light emitters, for example, can be alternately termed red indicating lamps.

The different colors used in the indicating lamps can be yellow and red, or other combination(s) of colors that are perceptually distinguishable from each other for the bulk of the driving population, such as by having center wavelengths clearly separate and distinct from each other. According to an embodiment, the two colors used differ from each other by relative center wavelength spacing of at least 40 nm, such as 50 nm spacing in an embodiment using red with a center wavelength between about 635 and 700 nm and yellow with a center wavelength between about 560 and 585 nm.

The indicating lamps can have light emitters with a color arrangement that is favorable for safety and, preferably, that conforms with the general pattern followed for automotive and truck vehicles. As shown in FIG. 1A, for example, a yellow indicating lamp 16 is disposed to face a predominantly forward angle relative to the forward path of plow blade 11, visible from the forward direction. Yellow indicating lamp 16 can lie along or near the top front edge of the blade 11, for visibility by a viewer in position forward of and facing the front surface of plow blade 11; indicating lamps for front surface identification may be spaced apart from the curved contact surface of the blade. As shown in the FIG. 1A example, yellow indicating lamp 16 is above the moldboard 40 and above a contact surface 24, the portion of the blade that is in constant contact with the snow and other sediment. The yellow indicating lamp 16 is preferentially mounted into a recess formed in the front or top surface of the blade 11, along an upper edge 26, and/or into a recess formed in the front or top surface of the angled wing 12. Multiple yellow indicating lamps 16 may be mounted near the top edges and corners of both left and right sides of the plow blades and/or wings, visible from a forward direction relative to the blade 11 contact surface 24.

Figure 1C:
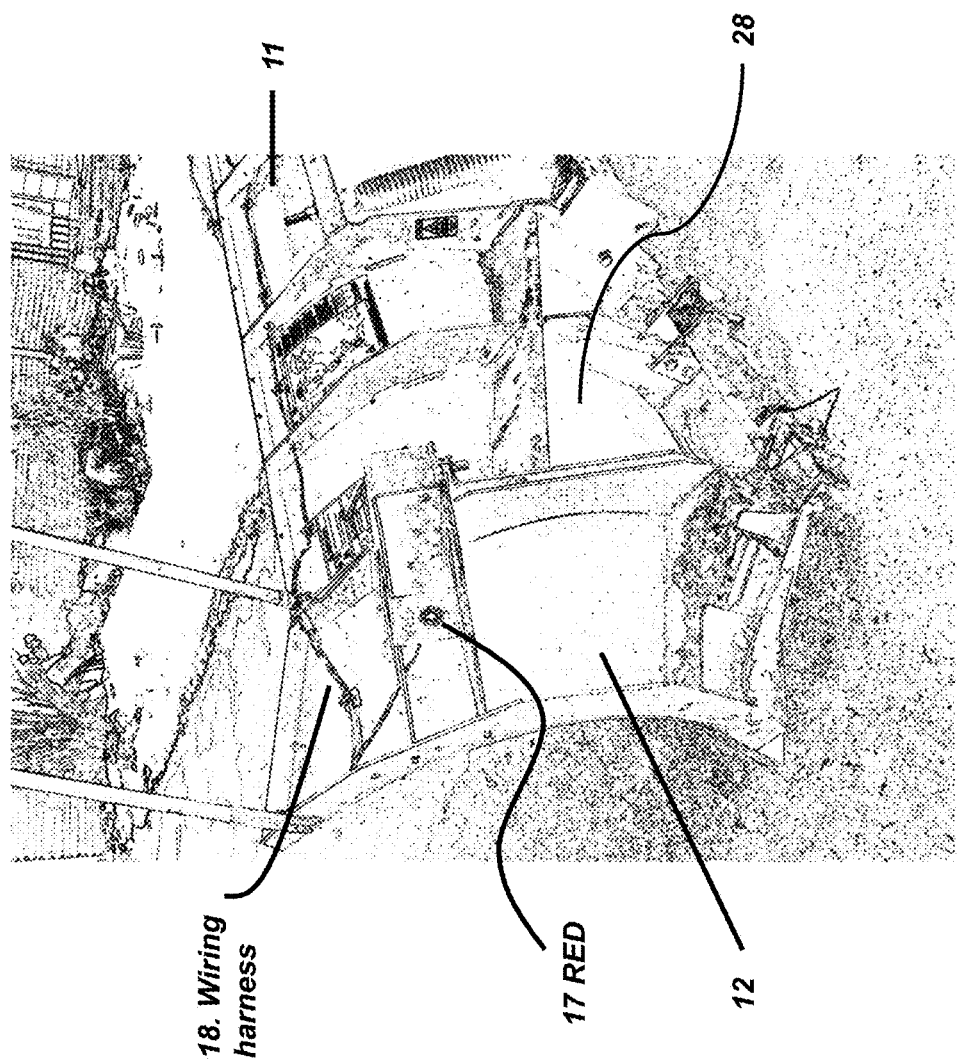
FIG. 1C shows a snow plow blade from the rear perspective.

As shown in FIGS. 1B and 1C, a red light indicating lamp 17 faces rearward or backward. It can be advantageous that rearward-facing lamps 17 be substantially directional, with most of the emitted light aimed in the direction that the lamp is facing, as described in more detail subsequently. The red lamp 17 can be mounted on a frame member or on the rear mounting surface of the blade 11; mounted in this way, lamp 17 is intended to face rearward and to be visible only from a position facing the rear of blade 11, that is, only from a position from where at least some portion of the rear of blade 11 can be seen. Lamp 17, when mounted in this way, is protected and shielded from snow impact or from contact with other sedimentary material that is being pushed forward, or might otherwise be deposited on the blade 11 surface. Preferentially, red lamp 17 can be mounted into a recess formed in the rear framing or directly against the mounting surface of the blade 11. Red lamp 17 may also be mounted into the rear mounting surface of angled wing 12 shown in FIG. 1C. Multiple red lamps 17 may be mounted in the rear mounting surfaces, such as near the top corners of both left and right sides of the plow blade 11 and/or wings 12. In general, the red lamps 17 are disposed to direct light outward from the blade, with the bulk of generated light directed generally orthogonal to the rear surface of the plow assembly and can be angled outward, toward either side edge of blade 11.

It should be emphasized that the Applicant's solution recognizes and addresses different requirements for forward vs. rearward indicator visibility. According to an embodiment of the present disclosure, the rearward-facing indicating lamp, red lamp 17 in the example of FIG. 1B, is clearly visible only from positions behind the plow blade, that is, the directed light from lamp 17 is only visible when viewing some portion(s) of the plow blade from the rear. Effects of or stray portions of the illumination from lamp 17 might be noticeable from in front of, or to the side of, plow blade 11 due to scattering or reflection. However, the light from lamp 17 is directed rearwards. Thus, for example, a driver who is traveling ahead of plow blade 11 is prevented from seeing, or at least receives no illumination from, rearward-facing red lamp 17. The forward-facing indicating lamp, such as yellow lamp 16 in the FIG. 1A example, is visible from a position forward of the plow; the forward-facing lamp may or may not be visible to a driver or other person viewing the plow from the rear. This arrangement is beneficial for clearly indicating, to a nearby driver or pedestrian, not only the distances of the plow blade's overall extension, but also whether the front or the rear of the plow blade is in view.

By the arrangement described herein, the Applicant has recognized that unambiguous indication of the rear of the plow, marking plow features and distinguishing rear from front, has particular value for traffic safety. By contrast to rear visibility, headlights of the plow vehicle 10 itself are generally sufficient for clearly indicating the edges, outline, and front of the plow blade and thus, the blade 11 orientation. This indicator arrangement, with rearward indicators concealed from view from the forward direction, also takes advantage of the protection that can be provided by mounting behind the contact surface of the plow blade. A mounting position that is well-protected from impact and continued contact against piled snow or sediment is advantaged for guarding against dislodgement or damage to the rearward indicators.

A wiring harness 18 provides DC power to both LED indicating lamps and can be routed as shown in the view of a portion of frame surface 28 in FIG. 1C. The red and yellow indicating lamps 17 and 16 can be powered from vehicle power, typically a nominal 12 VDC from a standard alternator, with current routed through wire harness 18.

Figure 2:
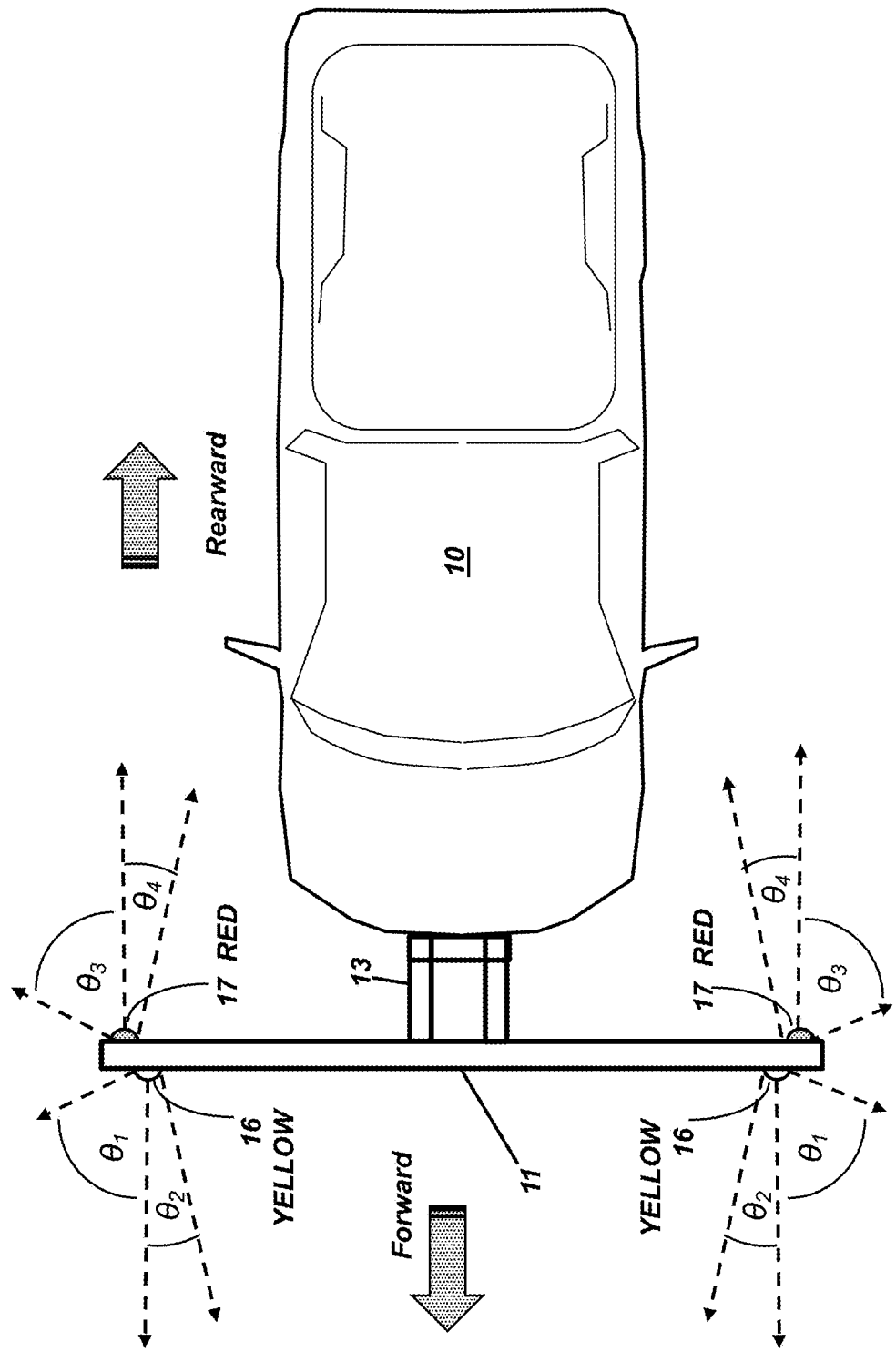
FIG. 2 is a schematic top view that shows a snow plow blade mounted orthogonally to the front of a vehicle for plowing or for travel, depicting the angular extent of light emitted by the yellow and red indicating lamps into the horizontal direction.

The overhead view of FIG. 2 shows how an embodiment using the Applicant's lighting arrangement works for the snow plow vehicle 10, with plow blade 11 and plow blade attachment and support structure 13. Yellow indicating lamps 16 are located at the front corners or edges of the moldboard or along the front contact surface of plow blade 11. Red indicating lamps 17 are located on the rear mounting or frame surface of plow blade 11, such as near the top rear corners.

The yellow indicating lamps 16 can emit light in the horizontal direction over a total angle of $\theta_Y=\theta_1+\theta_2$, where each of $\theta_1$ and $\theta_2$ is measured relative to the normal to the surface of the indicating lamp 16. Indicating lamp 16 directs most of its emitted light over an angle $\theta_Y$ between 20 and 180 degrees, and preferentially over an angle $\theta_Y$ between 90 and 120 degrees. Indicating lamp 16 preferentially emits into angle $\theta_1$ that ranges between 45 and 90 degrees.

Red indicating lamps 17 in the FIG. 2 example emit the bulk of their light, such as at least 70%, for example, in the generally horizontal direction over a total angle of $\theta_R=\theta_3+\theta_4$, where each of $\theta_3$ and $\theta_4$ can be a solid angle measured relative to normal to the moldboard or to the surface of the indicating lamp 17. Indicating lamp 17 directs most of its emitted light energy over an angle $\theta_R$ between 20 and 180 degrees, and preferentially over a solid angle $\theta_R$ between between 90 and 110 degrees. The light emitter 17 preferentially emits into angle $\theta_3$ that ranges between between 45 and 90 degrees.

Figure 3A:
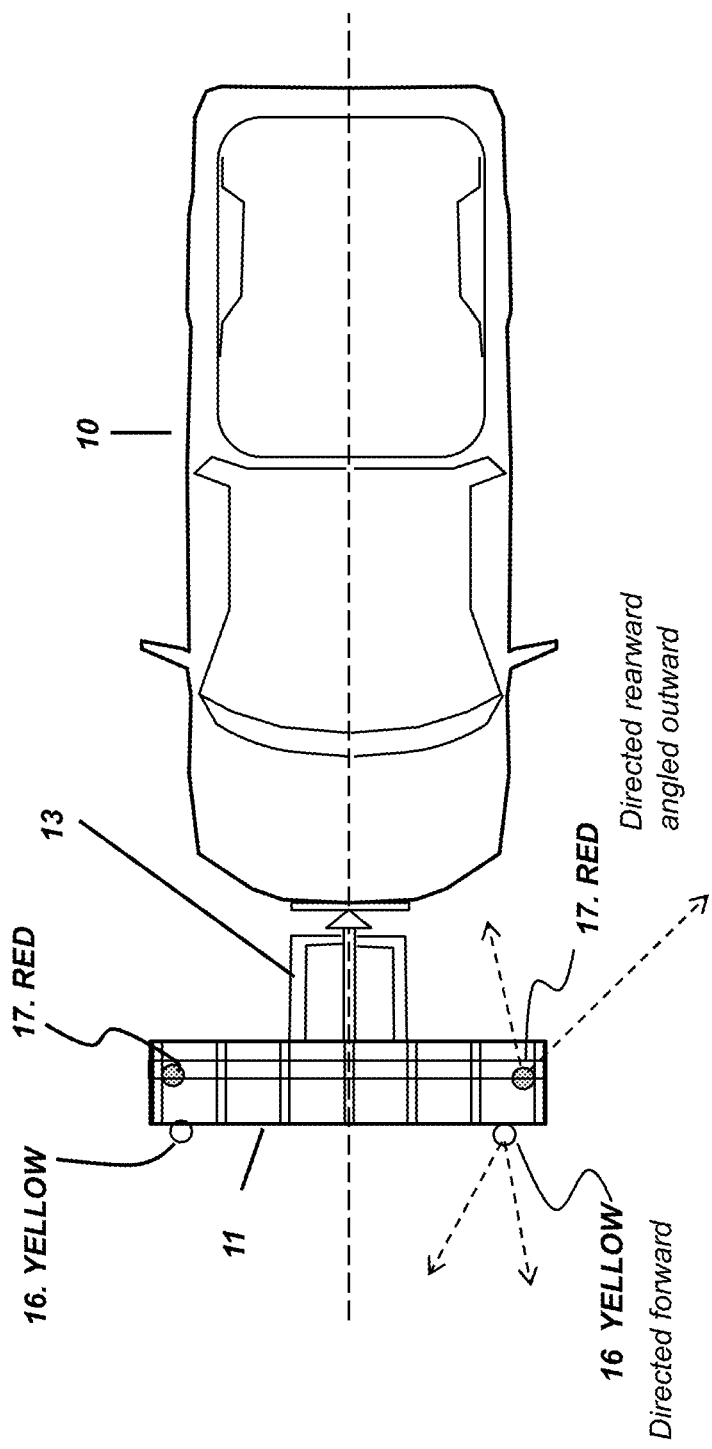
FIG. 3A is a schematic top view that shows a snow plow blade mounted to the front of a vehicle and positioned orthogonally to the forward direction on a vehicle for plowing or for travel.
Figure 3B:
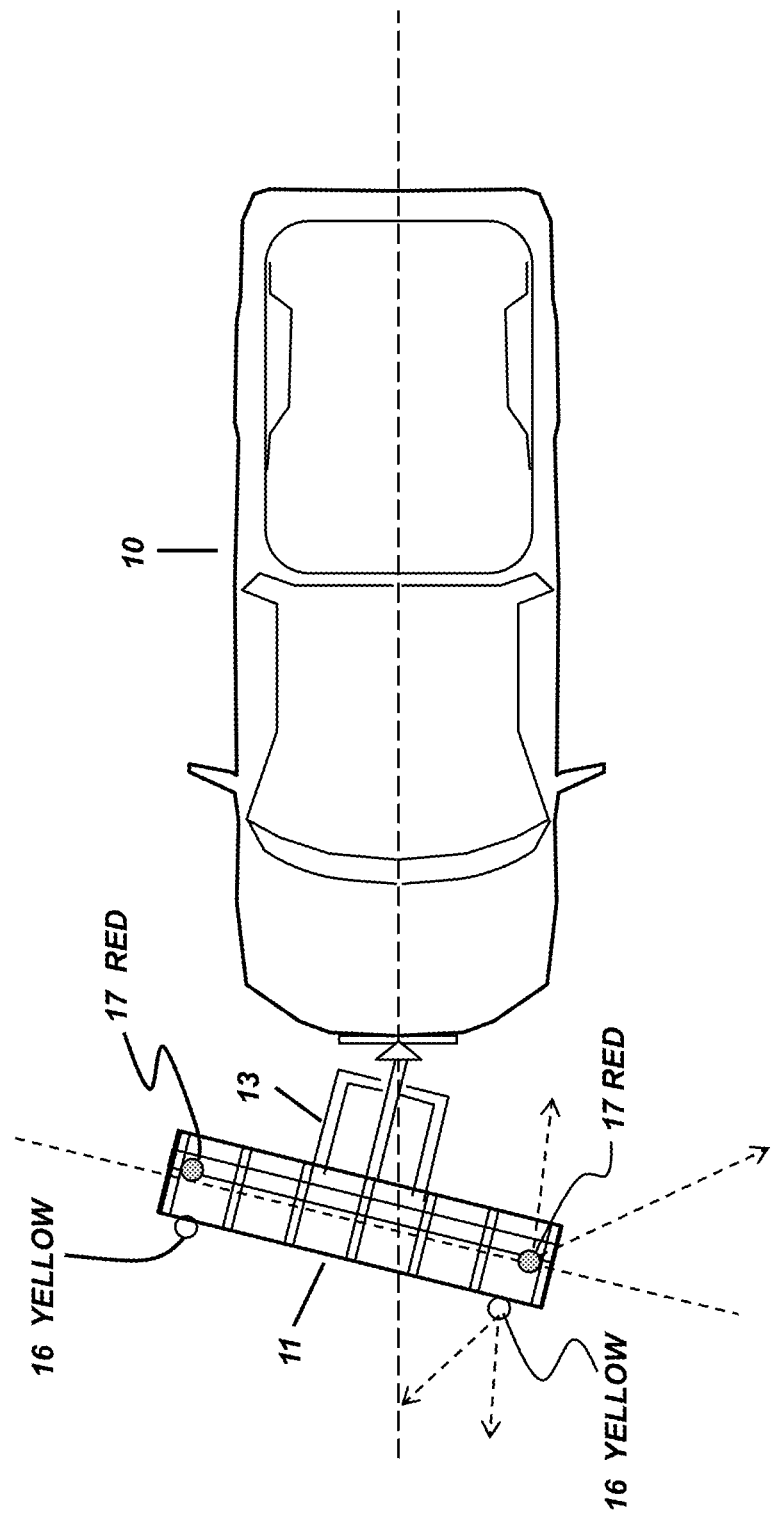
FIG. 3B is a schematic top view that shows a snow plow blade positioned obliquely to the forward direction on a vehicle for plowing or for travel.

Top views of FIGS. 3A and 3B show how the lighting arrangement works for the snow plow vehicle 10 having front-mounted plow blade 11, both configured for traffic and when plowing. Viewed from positions behind snow plow blade 11, one or both rear-facing red indicating lamps 17 are clearly visible; yellow front-facing lamps may be concealed from view from positions behind blade 11. At positions in front of blade 11, one or both yellow indicating lamps 16 can clearly be seen; red indicating lamps 17 are concealed so that they are not visible from positions forward and in the path of plow blade 11.

Figure 4A:
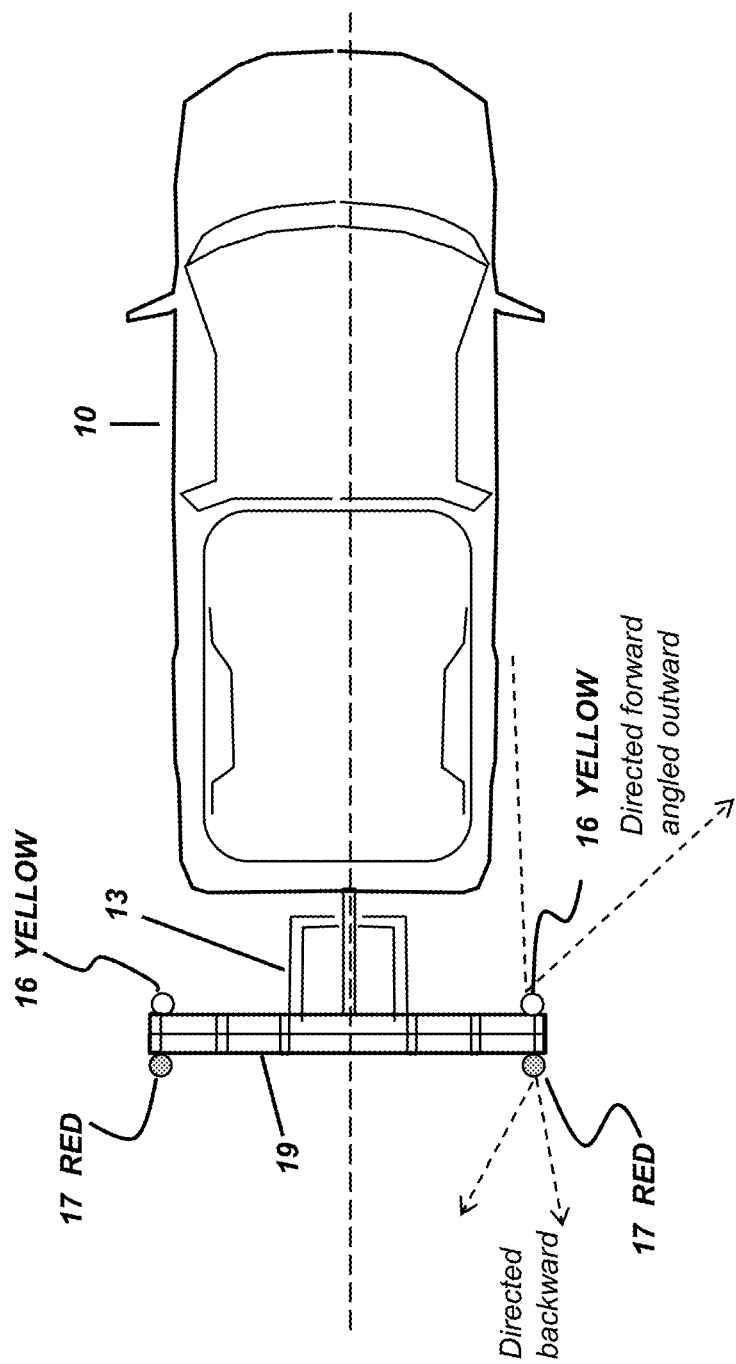
FIG. 4A is a schematic top view that shows a back blade plow mounted to the rear of a vehicle and positioned orthogonally to the rearward direction at the rear of a vehicle for plowing or for travel.

A back blade can have its surfaces configured in a reverse manner from front blade 11, such as with respect to moldboard curvature and vehicle orientation; however, similar principles for controlled indicating lamp visibility can be applied. The overhead view of FIG. 4A shows how the lighting arrangement, with spectrally distinct forward and rearward indicators, works for the snow plow vehicle having a back-blade plow 19, both in traffic and when plowing. At positions behind the back-blade plow 19, with the rear surface of back-blade plow 19 in view, one or both red indicating lamps 17 are clearly visible. At positions forward of the back-blade plow 19, with respect to vehicle 10, one or both yellow indicating lamps 16 can clearly be seen. Indicating lamps 17 on the opposite side of back-blade plow 19 are preferably concealed from view for a viewer standing alongside or in front of vehicle 10. Concealment can be simply effected by lamp placement; a housing, hood, or protective covering can also help to conceal an indicating lamp mounted on one side from visibility from a position on the opposite side of the plow blade 11.

Figure 4B:
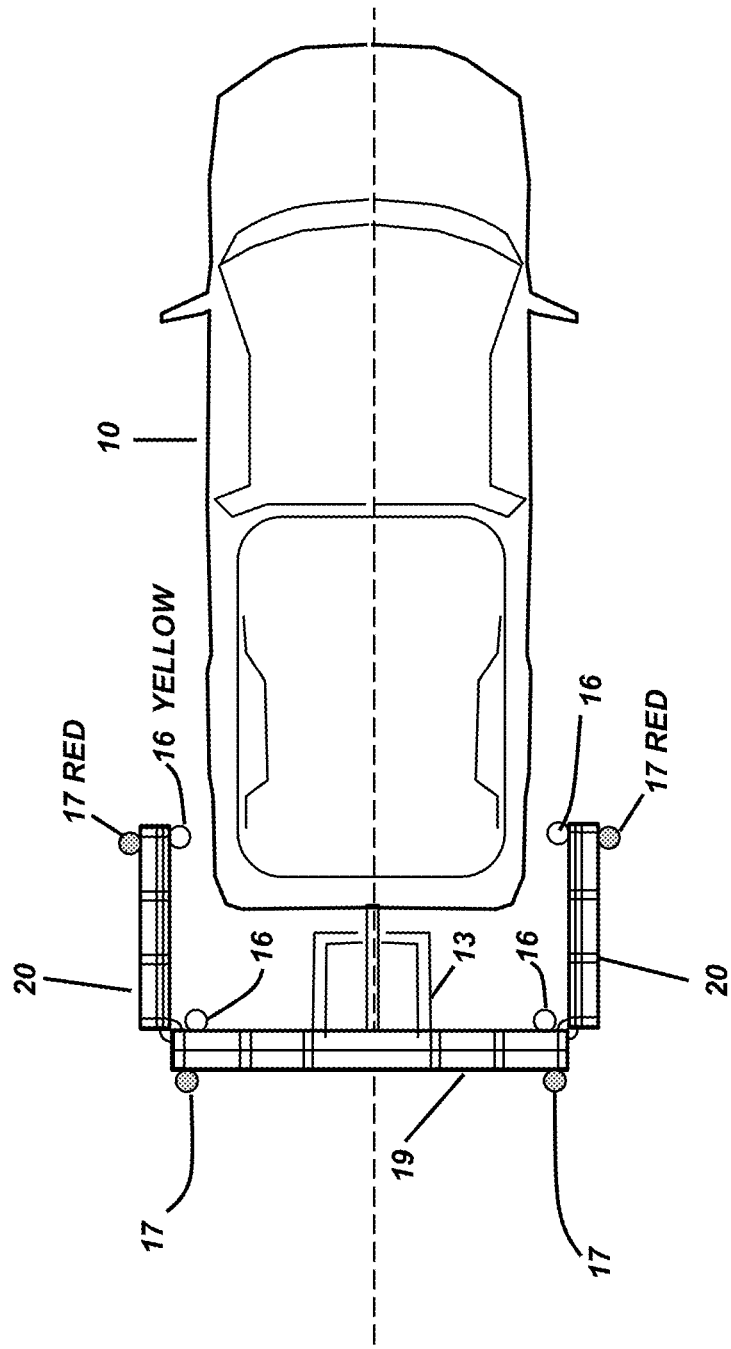
FIG. 4B is a schematic top view that shows a back blade plow positioned orthogonally to the rearward direction at the rear of a vehicle for plowing or for travel, with back blade plow wings attached to the side edges of the back blade plow, and retracted to the sides of the truck.

The actual plow mounting arrangement details can differ, depending on the type of snow plow blade. FIG. 4B is a schematic top view that shows a back-blade plow 19 mounted orthogonally to the rearward direction at the rear of vehicle 10 for plowing or for travel, with back-blade plow wings 20 attached to the side edges of the back blade plow 19, and retracted to the sides of vehicle 10. Red indicating lamps 17 are mounted onto the rear-facing surface of back-blade plow 19, and yellow indicating lamps 16 are mounted onto the front-facing surfaces of back blade plow 19. Red indicating lamps 17 are also mounted onto the outer surfaces of plow wings 20, with yellow indicating lamps mounted onto the inner surfaces of the plow wings 20. From positions behind the plow 19, red indicating lamps 17 on the rear of back-blade plow 19 are clearly visible, as are one or both of the red indicating lamps 17 mounted on the plow wings 20. At positions forward of the back blade plow 19, two or more of the four yellow indicating lamps 16 mounted on back blade plow 19 and plow wings 20 can clearly be seen. Indicators on one side can be concealed from visibility from the opposite side, making it clear which side of the plow blade is visible to a nearby driver.

Figure 4C:
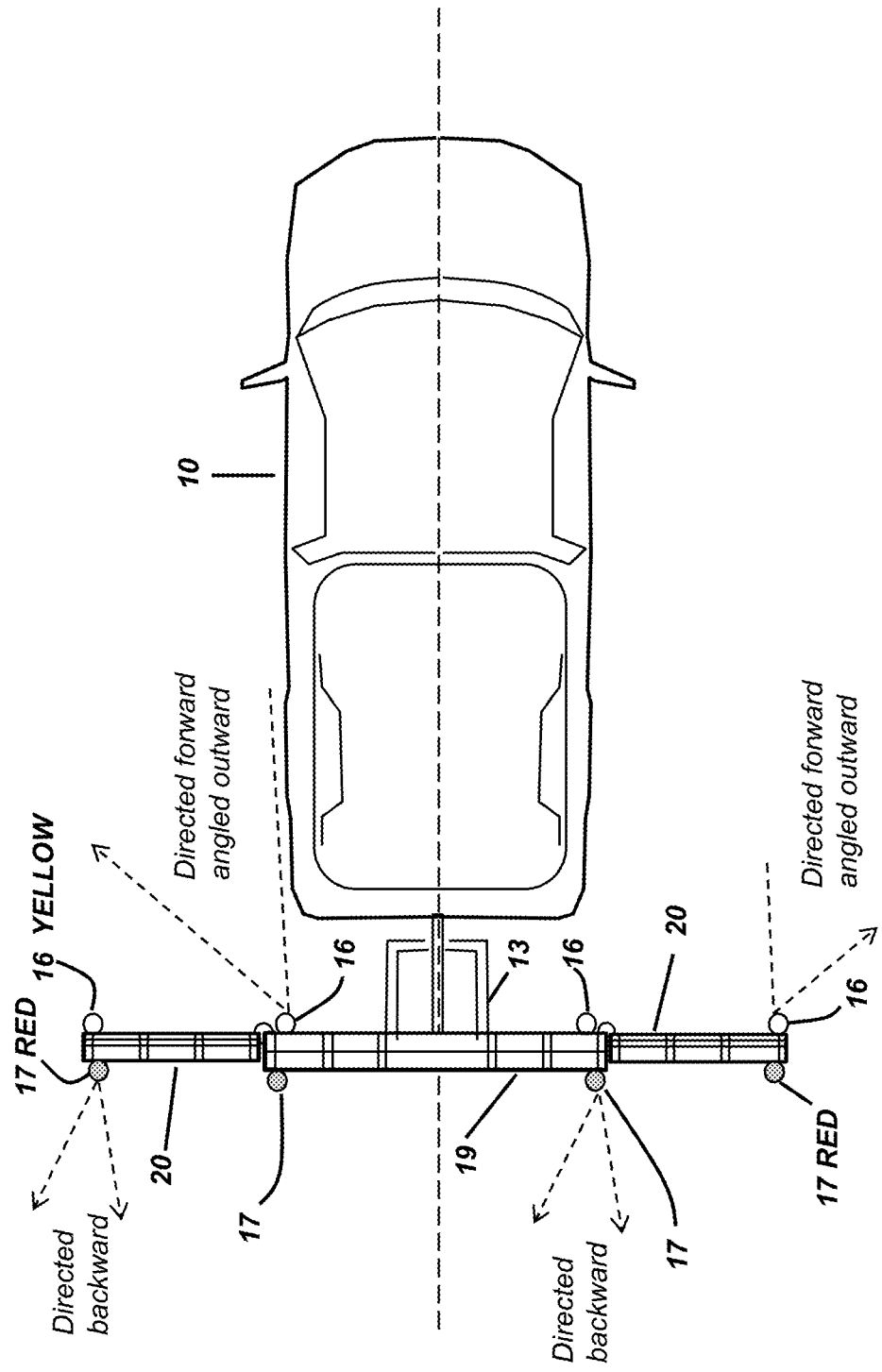
FIG. 4C is a schematic top view that shows a back blade plow positioned orthogonally to the rearward direction at the rear of a vehicle for plowing or for travel, with back blade plow wings attached to the side edges of the back blade plow, and extended in the width direction.

FIG. 4C is a schematic top view that shows back-blade plow 19 mounted orthogonally to the rearward direction at the rear of vehicle 10 for plowing or for travel, with back blade plow wings 20 attached to the side edges of the back blade plow 19, and extended in the width direction. Red indicating lamps 17 are mounted for visibility along the rear-facing surface of back blade plow 19, and yellow indicating lamps 16 are mounted onto the front-facing surfaces of back blade plow 19. Red indicating lamps 17 are also mounted onto the rear-facing surfaces of plow wings 20, with yellow indicating lamps mounted onto the front-facing surfaces of the plow wings 20. At positions behind the plow 19, red light indicating lamps 17 on the rear of back-blade plow 19 and plow wings 20 are clearly visible. At positions in front of the back blade plow 19, yellow indicating lamps 16 mounted on back blade plow 19 and plow wings 20 can clearly be seen; red lamps 17 are not visible from positions forward of back blade plow 19.

Figure 5A:
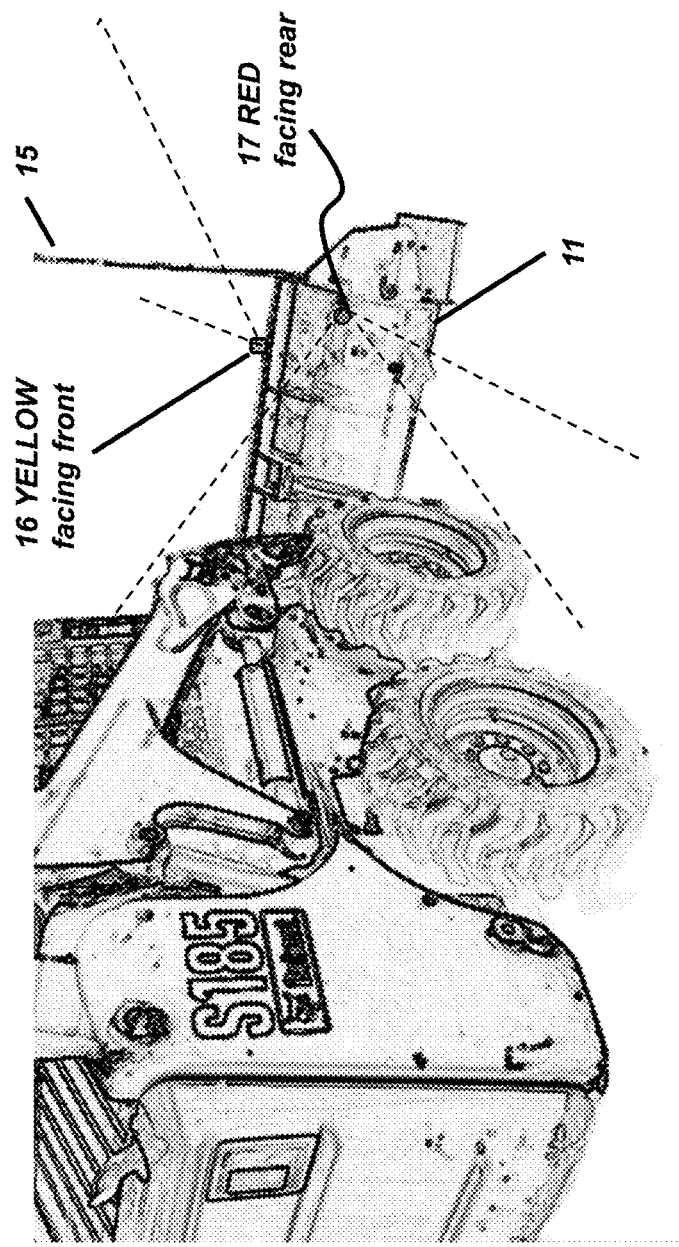
FIG. 5A shows a rear perspective view of a corner of a snow plow blade having a red indicating lamp mounted in a rearward-facing position and a yellow indicating lamp mounted in a forward-facing position according to an embodiment of the present disclosure.

FIG. 5A shows a rear perspective view of a corner of plow blade 11 having a red indicating lamp 17 mounted in a rearward-facing position and a yellow indicating lamp 16 mounted in a forward-facing position according to an embodiment of the present disclosure. In the embodiment shown, the front-facing indicating lamp may be visible from the rear of the plow; however, the rear-facing indicating lamp is not visible from the opposite, front side or contact side of the plow.

Figure 5B:
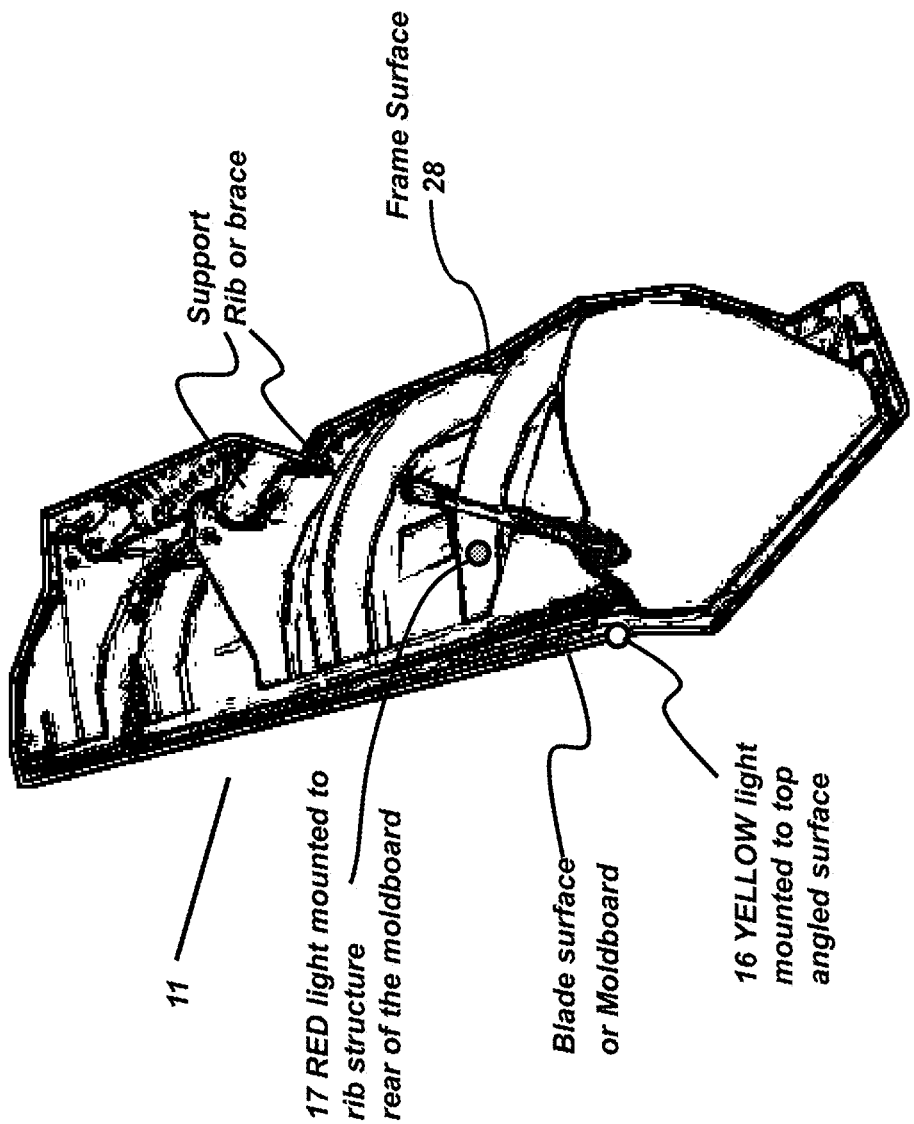
FIG. 5B shows the snow plow blade of FIG. 5A from the rear and frame side.

FIG. 5B shows the corresponding configuration of indicating lamps 16, 17 on snow plow blade of FIG. 5A from the rear and frame surface side. In both FIGS. 5A and 5B it can be noted that mounting the rear, red indicating lamp 17 behind the contact surface 24 of the plow, such as along a rib or other support structure of the frame, helps to protect the bulb of indicating lamp 17 from dirt as well as from impact with snow, ice, and road materials, thus extending bulb life and utility and helping to prevent dislodgement or other damage. Each indicating lamp 16 or 17 can be protected by a suitable housing or protective cover, for example.

Figure 6:
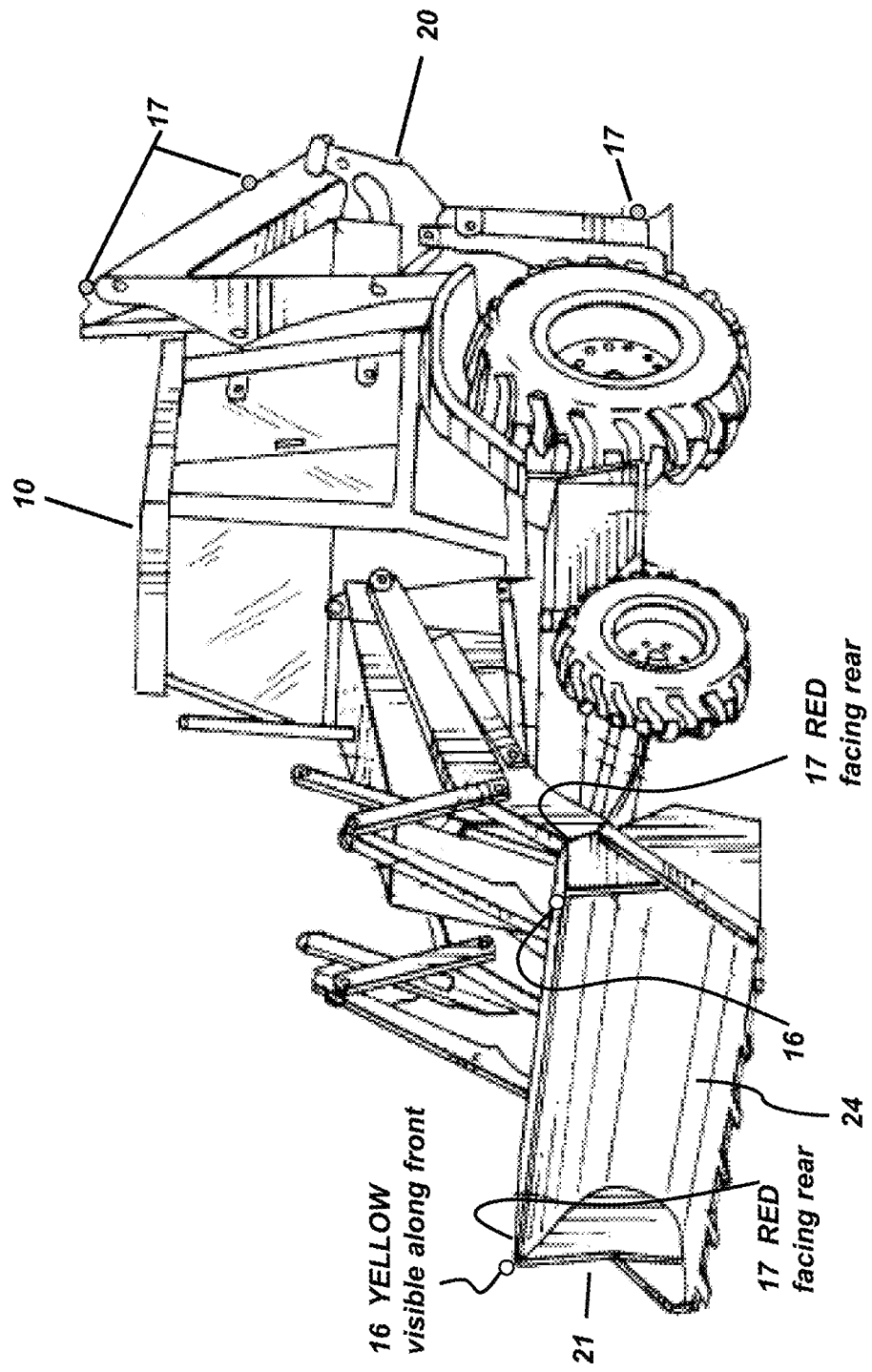
FIG. 6 shows a front-loader mounted on a vehicle having a red indicating lamp mounted in a rearward-facing position and a yellow indicating lamp mounted in a forward-facing position according to an embodiment of the present disclosure.

Embodiments of the present disclosure can also be used with various types of earthmoving equipment that are featured with concave contact surfaces. For example, FIG. 6 shows a front-loader with a bucket 21 mounted on a vehicle 10. Bucket 21 has a concave contact surface 24 backed by a rear frame surface and having a red indicating lamp 17 mounted in a rear-facing position on the bucket 21 and concealed from front view visibility and a yellow indicating lamp 16 mounted in a front-facing position on the bucket 21 and concealed from rear view visibility according to an embodiment of the present disclosure.

Figure 7:
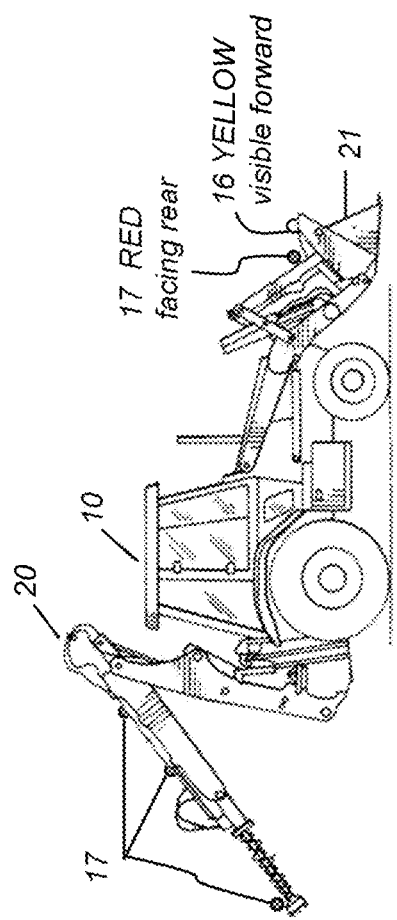
FIG. 7 shows a front-loader with an implement attached to the power-take-off at the rear of the vehicle, having red indicating lamps mounted in a rearward-facing position and yellow indicating lamps mounted in a forward-facing position according to an embodiment of the present disclosure.

FIG. 7 shows a front-loader with bucket 21 mounted on vehicle 10, further with an implement attached to the power-take-off at the rear of the vehicle, having red indicating lamps 17 mounted in rearward-facing positions and yellow indicating lamps 16 mounted in a forward-facing position according to an embodiment of the present disclosure.

Figure 8:
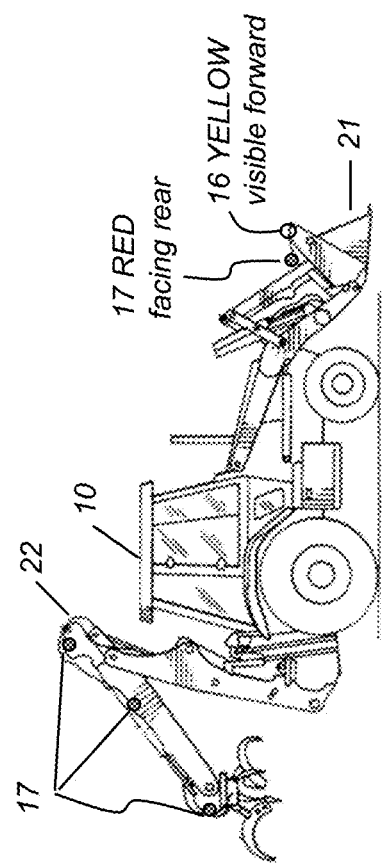
FIG. 8 shows a front-loader with an implement attached to the power-take-off at the rear of the vehicle, having red indicating lamps mounted in a rearward-facing position and yellow indicating lamps mounted in a forward-facing position according to an embodiment of the present disclosure.

FIG. 8 shows a front-loader with bucket 21 mounted on vehicle 10, further with an implement attached to the power-take-off at the rear of the vehicle, having red indicating lamps 17 mounted in rearward-facing positions and yellow indicating lamps 16 mounted in a forward-facing position according to an embodiment of the present disclosure.

Figure 9:
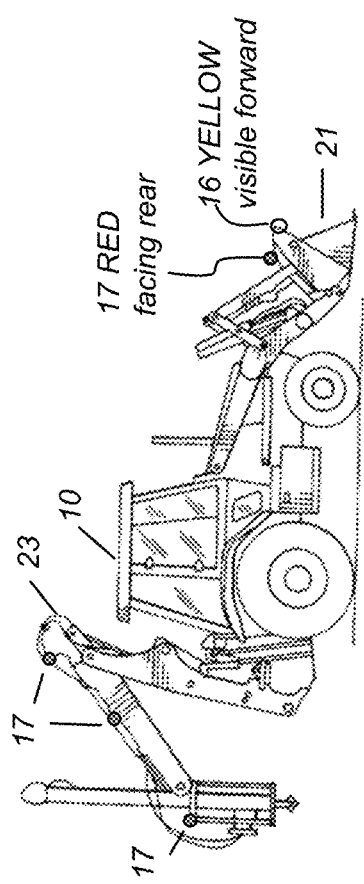
FIG. 9 shows a front-loader with an implement attached to the power-take-off at the rear of the vehicle, having red indicating lamps mounted in a rearward-facing position and yellow indicating lamps mounted in a forward-facing position according to an embodiment of the present disclosure.

FIG. 9 shows a front-loader with bucket 21 mounted on vehicle 10, further with an implement attached to the power-take-off at the rear of the vehicle, having red indicating lamps 17 mounted in rearward-facing positions and yellow indicating lamps 16 mounted in a forward-facing position according to an embodiment of the present disclosure.

In each of FIGS. 6 through 9, the details of the actual positions and means of attachment of the red indicating lamps 17 and yellow indicating lamps 16 can differ, depending on the intended use of the equipment mounted on the vehicle 10. It can be noted that mounting the red indicating lamp 17 behind the contact surface of the front-loader bucket 21 helps to protect the indicating lamp bulb 17 from dirt as well as from impact with materials being loaded into bucket 21, thus helping to extend bulb life and utility.

According to an embodiment of the present disclosure, a plow blade has a first and second indicating lamp of a first color mounted on the rear of the blade, opposite the contact surface of the blade, with each first color bulb aimed to direct light along and outward from a corresponding side of a vehicle attached to the blade. The blade further has a first and second indicating lamp of a second color mounted on the blade and visible from the front of the blade, but concealed from view at the rear of the blade.

The invention has been described in detail with particular reference to certain preferred embodiments thereof, but it will be understood that variations and modifications can be effected within the spirit and scope of the invention.

The invention claimed is:

1. A snow plow blade comprising:
   a moldboard shaped with a concave front contact surface that faces a forward direction and having a convex rear frame surface that faces an opposite rearward direction, wherein the rear frame surface has a supporting frame with one or more supporting frame members that extend in the rearward direction,
   a first indicating lamp that is coupled to the plow blade and is energizable to emit light of a first color in the rearward direction, wherein the energized first indicating lamp is concealed from visibility from the forward direction; and
   a second indicating lamp that is coupled to the plow blade, energizable to emit light of a second color, concealed from visibility from the rear direction, and visible from the forward direction.

2. The snow plow blade of claim 1 wherein the first color is red.

3. The snow plow blade of claim 1 wherein the second color is yellow.

4. The snow plow blade of claim 1 wherein the first indicating lamp is coupled to the supporting frame of the snow plow blade.

5. The snow plow blade of claim 1 wherein the second indicating lamp is coupled to a wing of the snow plow blade, along an outside edge of the snow plow blade.

6. The snow plow blade of claim 1 wherein the first indicating lamp is directed to emit light toward a road surface and past outer edges of the plow moldboard.

7. The snow plow blade of claim 1 wherein the first indicating lamp comprises a light-emitting diode.

8. The snow plow blade of claim 1 wherein respective center wavelengths of the first and the second colors differ from each other by 40 nm or more.

9. An illumination apparatus for a snow plow blade comprising:
   a first indicating lamp comprising a first light emitter of a first color, wherein the first indicating lamp is coupled to the snow plow blade along a rear frame surface that lies behind a concave front surface of a plow moldboard,
   wherein the first light emitter is configured to be concealed from visibility from a forward direction facing the concave front contact surface of the snow plow blade;
   a second indicating lamp comprising a second light emitter of a second color, wherein the second indicating lamp is coupled to the snow plow blade and the second light emitter is visible from the forward direction and concealed from view when facing the snow plow blade from a rear direction that lies opposite the forward direction, wherein respective center wavelengths of the first and the second colors differ from each other by 40 nm or more; and a power circuit configured to direct power to energize the first and second indicating lamps.

10. The snow plow blade of claim 9 wherein the first color is red.

11. The snow plow blade of claim 9 wherein the second color is yellow.

12. A method for configuring a snow plow blade comprising:

coupling to the snow plow blade a first indicating lamp of a first color for emitting light of the first color toward a forward position facing a concave contact surface of the snow plow blade;

wherein the first indicating lamp is concealed from visibility from the rear direction; and coupling, to a rear frame surface of the snow plow blade that lies opposite the concave contact surface, a second indicating lamp of a second color for emitting light of the second color rearward with respect to the concave contact surface of the snow plow blade, wherein the emitted light of the second color is blocked from view from the forward position, wherein respective center wavelengths of the first and second colors differ from each other by at least 40 nm.

13. The method of claim 12 further comprising coupling the second indicating lamp within a housing.

14. The method of claim 12 wherein the second color is red, with a center wavelength between 635 and 700 nm.

15. The method of claim 12 wherein the first color is yellow, with a center wavelength between 560 and 590 nm.

16. The method of claim 12 wherein coupling the first indicating lamp to the snow plow blade comprises coupling the lamp to an edge surface of the blade that borders the contact surface and the rear frame surface.

* * * * *